United States Patent
Zhang et al.

(10) Patent No.: US 11,979,905 B2
(45) Date of Patent: May 7, 2024

(54) UPLINK DATA TRANSMISSION METHOD, USER DEVICE, AND COMPUTER READABLE STORAGE MEDIUM

(71) Applicant: SPREADTRUM COMMUNICATIONS (SHANGHAI) CO., LTD., Shanghai (CN)

(72) Inventors: Meng Zhang, Shanghai (CN); Xingya Shen, Shanghai (CN); Su Huang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 573 days.

(21) Appl. No.: 17/266,765

(22) PCT Filed: Jul. 9, 2019

(86) PCT No.: PCT/CN2019/095162
§ 371 (c)(1),
(2) Date: Feb. 8, 2021

(87) PCT Pub. No.: WO2020/029733
PCT Pub. Date: Feb. 13, 2020

(65) Prior Publication Data
US 2021/0315006 A1    Oct. 7, 2021

(30) Foreign Application Priority Data
Aug. 10, 2018    (CN) .......................... 201810913741.7

(51) Int. Cl.
*H04W 74/00*    (2009.01)
*H04W 72/0453*    (2023.01)
*H04W 74/0808*    (2024.01)

(52) U.S. Cl.
CPC ... *H04W 74/0808* (2013.01); *H04W 72/0453* (2013.01); *H04W 74/004* (2013.01)

(58) Field of Classification Search
CPC ..... H04L 5/003; H04L 5/0035; H04L 5/0046; H04L 5/0051; H04L 5/0098;
(Continued)

(56) References Cited

U.S. PATENT DOCUMENTS 10,912,128 B2 *    2/2021    Li .......................... H04W 88/08
2016/0366689 A1    12/2016    Zhang et al.
(Continued)

FOREIGN PATENT DOCUMENTS

| CN | 106658718 A | 5/2017 |
|---|---|---|
| CN | 106961737 A | 7/2017 |

(Continued)

OTHER PUBLICATIONS

CATR, Considerations on LBT in NR-U, 3GPP TSG RAN WG1 Meeting #93, R1-1807205, 3 pages, May 21-25, 2018.*
(Continued)

*Primary Examiner* — Frank Duong
(74) *Attorney, Agent, or Firm* — CANTOR COLBURN LLP

(57) ABSTRACT

An uplink data transmission method, a user equipment, and a computer readable storage medium. The method includes: performing LBT respectively on at least one sub-band corresponding to a resource used for transmitting uplink data, wherein a frequency domain is divided into two or more sub-bands, and the resource used for transmitting uplink data corresponds to at least one of the two or more sub-bands; and transmitting the uplink data on at least one sub-band on which LBT succeeds. Using the present solution can increase data transmission efficiency and resource utilization.

18 Claims, 4 Drawing Sheets

(58) Field of Classification Search
CPC ........... H04W 72/0453; H04W 74/004; H04W 74/006; H04W 74/0808; H04W 74/0816; H04W 84/12
See application file for complete search history.

(56) References Cited

U.S. PATENT DOCUMENTS

| | | | |
|---|---|---|---|
| 2017/0202021 | A1 | 7/2017 | Lee |
| 2017/0202022 | A1 | 7/2017 | Chendamarai Kannan et al. |
| 2017/0311327 | A1 | 10/2017 | Tanaka |
| 2018/0007710 | A1 | 1/2018 | Tanaka |
| 2018/0027452 | A1 | 1/2018 | Tanaka |
| 2018/0249499 | A1 | 8/2018 | Kim et al. |
| 2019/0268883 | A1* | 8/2019 | Zhang ................... H04W 16/14 |
| 2019/0274137 | A1* | 9/2019 | Bhattad ................ H04W 16/14 |
| 2020/0305184 | A1* | 9/2020 | Kim ....................... H04L 5/0053 |
| 2021/0307068 | A1 | 9/2021 | Kim et al. |
| 2021/0315006 | A1* | 10/2021 | Zhang ............... H04W 72/0453 |
| 2021/0360693 | A9* | 11/2021 | Iyer ....................... H04W 72/23 |

FOREIGN PATENT DOCUMENTS

| | | |
|---|---|---|
| CN | 106993334 A | 7/2017 |
| CN | 107211407 A | 9/2017 |
| CN | 107409392 A | 11/2017 |
| CN | 107889555 A | 4/2018 |
| EP | 3282803 A1 | 2/2018 |
| WO | 2017123769 A1 | 7/2017 |
| WO | 2018026182 A1 | 2/2018 |

OTHER PUBLICATIONS

Fujitsu, "Design of LAA UL transmission", 3GPP TSG RAN WG1 Meeting #80, R1-150186, Athens, Greece, Feb. 9-13, 2015, 3 pages.
International Search Report for International Application No. PCT/CN2019/095162; dated Sep. 27, 2019.
CNIPA First Office Action for corresponding CN Application No. 201810913741.7; dated Apr. 30, 2021.
EPO Extended European Search Report for corresponding EP Application No. 19848372.9; dated Mar. 30, 2022.
Ericsson, "Frame structure for NR-U", 3GPP TSG-RAN WG1 Meeting #93, Tdoc R1-1806250, May 21-25, 2018, 4 pages.

* cited by examiner performing Listen Before Talk (LBT) respectively on at least one sub-band corresponding to a resource used for transmitting uplink data, wherein a frequency domain is divided into two or more sub-bands, and the resource used for transmitting uplink data corresponds to at least one of the two or more sub-bands / 11 transmitting the uplink data on at least one sub-band on which LBT succeeds / 12

FIG. 1

UPLINK DATA TRANSMISSION METHOD, USER DEVICE, AND COMPUTER READABLE STORAGE MEDIUM

CROSS-REFERENCE TO RELATED APPLICATIONS

This is the U.S. national stage of application No. PCT/CN2019/095162 filed on Jul. 9, 2019. Priority under 35 U.S.C. § 119(a) and 35 U.S.C. § 365(b) is claimed from Chinese Application No. 201810913741.7, filed Aug. 10, 2018, the disclosure of which is also incorporated herein by reference.

TECHNICAL FIELD

The present disclosure generally relates to communication technology field, and more particularly, to an uplink data transmission method, a user equipment and a computer readable storage medium.

BACKGROUND

The Licensed Assisted Access (LAA) system is a Long Term Evolution (LTE) system for accessing an unlicensed frequency band assisted by a licensed frequency band. The LAA system can effectively solve the problem of the LTE system's spectrum tension in the licensed frequency band by connecting the LTE system to the unlicensed frequency band.

One of the problems that the LTE system needs to solve when accessing the unlicensed frequency band is how to coexist fairly and effectively with WIFI and other wireless systems working in the unlicensed frequency band. In order to solve this problem, Listen Before Talk (LBT) mechanism is proposed.

LBT can also be called channel access, which enables wireless LANs to effectively share a same spectrum resource. Since channels on an unlicensed frequency band cannot be guaranteed to be available at all times, the LBT mechanism is adopted to monitor the channels and conduct channel idle assessment before transmitting data. If the LBT succeeds, a channel monitored currently is determined to be idle. If the LBT fails, the channel monitored currently is determined to be busy.

In prior art, in the LTE system, a User Equipment (UE) performs LBT on an entire carrier bandwidth. When the LBT succeeds, uplink data is transmitted on the carrier bandwidth, resulting in inefficient data transmission and resource utilization.

SUMMARY

Embodiments of the present disclosure may achieve a better data transmission efficiency and resource utilization.

In an embodiment of the present disclosure, an uplink data transmission method is provided, including: performing LBT respectively on at least one sub-band corresponding to a resource used for transmitting uplink data, wherein a frequency domain is divided into two or more sub-bands, and the resource used for transmitting uplink data corresponds to at least one of the two or more sub-bands; and transmitting the uplink data on at least one sub-band on which LBT succeeds.

Optionally, before transmitting the uplink data on the at least one sub-band on which LBT succeeds, the uplink data transmission method further includes: mapping the uplink data to the resource used for transmitting the uplink data; and performing a puncturing operation on the uplink data on sub-bands on which LBT fails.

Optionally, before transmitting the uplink data on the at least one sub-band on which LBT succeeds, the uplink data transmission method further includes: performing rate matching on the at least one sub-band on which LBT succeeds.

Optionally, before transmitting the uplink data on the at least one sub-band on which LBT succeeds, the uplink data transmission method further includes: determining whether a number of the at least one sub-band on which LBT succeeds exceeds a corresponding sub-band threshold; and when the number of the at least one sub-band on which LBT exceeds the corresponding sub-band threshold, transmitting the uplink data on the at least one sub-band on which LBT succeeds.

Optionally, a sub-band threshold corresponding to a number of the at least one sub-band used for performing LBT is one selected from a candidate sub-band threshold set.

Optionally, a base station indicates the number of the at least one sub-band used for performing LBT and the sub-band threshold corresponding to the number of the at least one sub-band used for performing LBT through a high-layer signaling.

Optionally, the base station indicates the number of the at least one sub-band used for performing LBT and the candidate sub-band threshold set corresponding to the number of the at least one sub-band used for performing LBT through a high-layer signaling, and indicates the sub-band threshold corresponding to the number of the at least one sub-band used for performing LBT through a Downlink Control Information (DCI).

Optionally before performing LBT respectively on the at least one sub-band corresponding to the resource used for transmitting uplink data, the uplink data transmission method further includes: determining the at least one sub-band used for performing LBT.

Optionally, determining the at least one sub-band used for performing LBT includes: matching the resource used for transmitting uplink data with a preset sub-band bandwidth; and using all the at least one sub-band corresponding to the resource used for transmitting uplink data as the at least one sub-band used for performing LBT.

Optionally, determining the at least one sub-band used for performing LBT includes: matching the resource used for transmitting uplink data with a preset sub-band bandwidth, and determining the number of the at least one sub-band corresponding to the resource used for transmitting uplink data; and using each sub-band in a preset sub-band set as the at least one sub-band used for performing LBT, wherein a number of the preset sub-band set matches the number of the at least one sub-band corresponding to the resource used for transmitting uplink data.

Optionally, one of multiple sub-band sets indicated by the base station through a high-layer signaling is selected as the preset sub-band set, wherein a number of each of the multiple sub-band sets matches with the number of the at least one sub-band corresponding to the resource used for transmitting uplink data.

Optionally, the base station indicates that one of the multiple sub-band sets is selected as the preset sub-band set through a DCI.

Optionally, one of a plurality of sub-band sets corresponding to a preset sub-band mapping table is selected as the preset sub-band set, wherein a number of each of the plurality of sub-band sets matches with the number of the at least one sub-band corresponding to the resource used for transmitting uplink data.

Optionally, transmitting the uplink data on the at least one sub-band on which LBT succeeds further includes: sending an indication information about the preset sub-band set to the base station.

In an embodiment of the present disclosure, a user equipment (UE) is provided, the UE includes: an LBT execution unit, adapted to perform LBT on at least one sub-band corresponding to a resource used for transmitting uplink data, respectively; wherein a frequency domain is divided into two or more sub-bands, and the resource used for transmitting uplink data corresponds to at least one of the two or more sub-bands; and a data transmission unit, adapted to transmit the uplink data on at least one sub-band on which LBT succeeds Optionally, the UE further includes: a data mapping unit, adapted to, before transmitting the uplink data on the at least one sub-band on which LBT succeeds, map the uplink data to the resource used for transmitting the uplink data; and a puncturing unit, adapted to, before transmitting the uplink data on the at least one sub-band on which LBT succeeds, perform a puncturing operation on uplink data mapped on sub-bands on which LBT fails.

Optionally, the UE further includes: a rate matching unit, adapted to, before transmitting the uplink data on the at least one sub-band on which LBT succeeds, perform rate matching on the at least one sub-band on which LBT succeeds.

Optionally, the UE further includes: a deciding unit, adapted to decide whether a number of the at least one sub-band on which LBT succeeds exceeds a corresponding sub-band threshold; wherein when the number of the at least one sub-band on which LBT succeeds exceeds the corresponding sub-band threshold, the data transmission unit is adapted to transmit the uplink data on the at least one sub-band on which LBT succeeds.

Optionally, the sub-band threshold corresponding to the number of the at least one sub-band used for performing LBT is one of the candidate sub-band threshold sets.

Optionally, the number of the at least one sub-band used for performing LBT and the sub-band threshold corresponding to the number of the at least one sub-band used for performing LBT are indicated by a base station through a higher layer signaling.

Optionally, the number of the at least one sub-band used for performing LBT and the candidate sub-band threshold set corresponding to the number of the at least one sub-band used for performing LBT are indicated by a base station through a high-layer signaling, and the sub-band threshold corresponding to the number of the at least one sub-band used for performing LBT is indicated by the base station through a Downlink Control Information (DCI).

Optionally, the UE further includes: a determining unit, adapted to, before performing LBT on the at least one sub-band corresponding to the resource used for transmitting uplink data, determine the at least one sub-band used for performing LBT.

Optionally, the determining unit includes: a first matching subunit, adapted to match the resource used for transmitting uplink data with a preset sub-band bandwidth; and a first determining subunit, adapted to use all the at least one sub-band corresponding to the resource used for transmitting uplink data as the at least one sub-band for performing LBT.

Optionally, the determining unit includes: the first matching subunit, adapted to match the resource used for transmitting uplink data with the preset sub-band bandwidth, and determine a number of sub-bands included in the resource used for transmitting uplink data; and a second determining subunit, adapted to use each sub-band in the preset sub-band set as the at least one sub-band for performing LBT, wherein a number of the preset sub-band set matches the number of the at least one sub-band corresponding to the resource used for transmitting uplink data.

Optionally, the second determining subunit is adapted to use one of multiple sub-band sets indicated by the base station through a high-layer signaling as the preset sub-band set, wherein a number of each of the multiple sub-band sets matches with the number of the at least one sub-band corresponding to the resource used for transmitting uplink data.

Optionally, the preset sub-band set is indicated by the base station through a DCI.

Optionally, the second determining subunit is adapted to select one from a plurality of sub-band sets corresponding to a preset sub-band mapping table as the preset sub-band set, wherein a number of each of the plurality of sub-band sets matches with the number of the at least one sub-band corresponding to the resource used for transmitting uplink data.

Optionally, the UE further includes: a sub-band indicating unit, adapted to send an indication information about the preset sub-band set to the base station when the uplink data is transmitted on the at least one sub-band with successful LBT.

In an embodiment of the present disclosure, a computer readable storage medium having computer instructions stored therein is provided, wherein once the computer instructions are executed, the above method is performed.

In an embodiment of the present disclosure, a user equipment including a memory and a processor is provided, wherein the memory has computer instructions stored therein, and when the processor executes the computer instructions, the above method is performed.

Embodiments of the present disclosure may provide following advantages.

In embodiments of the present disclosure, the frequency domain is divided into two or more sub-bands and the resource used for transmitting uplink data corresponds to at least one of the two or more sub-bands, therefore, LBT can be performed on each sub-band used for uplink data transmission, and the uplink data can be transmitted on some sub-bands with successful LBT, rather than waiting for successful LBT on all the sub-bands, which facilitates to improve data transmission efficiency and resource utilization effectively.

Further, when the number of the sub-bands with successful LBT exceeds the corresponding sub-band threshold, the uplink data is transmitted on the sub-bands with successful LBT, which facilitates to reduce reception failure of the base station and allow WIFI and other wireless systems working in unlicensed frequency bands have more transmission opportunity, thereby further improving resource utilization.

BRIEF DESCRIPTION OF THE DRAWINGS

FIG. 1 schematically illustrates a flow chart of an uplink data transmission method according to an embodiment;

DETAILED DESCRIPTION

In prior art, in the LTE system, a UE performs LBT on an entire carrier bandwidth. When the LBT succeeds, uplink data is transmitted on the carrier bandwidth, resulting in inefficient data transmission and resource utilization.

In embodiments of the present disclosure, an uplink data transmission method is provided. According to the data transmission method, a UE conducts LBT on multiple sub-bands, uplink data transmission may be performed on some sub-bands with successful LBT and there is no need to wait for successful LBT on all sub-bands, which facilitates to improve data transmission efficiency and resource utilization.

In order to clarify the object, characteristic and advantages of embodiments of the present disclosure, embodiments of present disclosure will be described clearly in detail in conjunction with accompanying drawings.

Referring to FIG. 1, FIG. 1 schematically illustrates a flow chart of an uplink data transmission method according to an embodiment. The method includes the following steps.

In step 11, LBT is performed on at least one sub-band corresponding to a resource used for transmitting uplink data, wherein a frequency domain is divided into two or more sub-bands, and the resource used for transmitting uplink data corresponds to at least one of the two or more sub-bands.

In some embodiments, the at least one sub-band corresponding to the resource used for transmitting uplink data may be one or multiple, and the UE performs LBT on each sub-band respectively. The at least one sub-band corresponding to the resource used for transmitting uplink data may include three or four sub-bands, etc.

Those skilled in the art can understand that, a number of sub-bands divided in the frequency domain is not specified, and a bandwidth of each sub-band may be set according to a bandwidth of WIFI and other wireless systems operating in an unlicensed frequency band. For example, each sub-band can have a bandwidth of 20M or approximately 20M, or an integer multiple of the bandwidth of 20M or approximately 20M.

Figure 2:
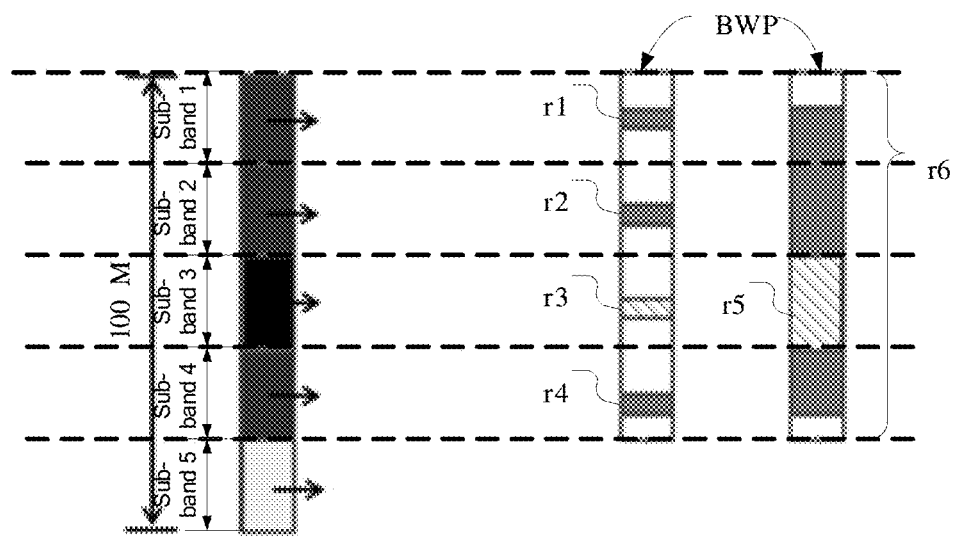
FIG. 2 schematically illustrates an uplink data transmission process according to an embodiment.

Referring to FIG. 2, taking a current uplink carrier bandwidth of 100M as an example, multiple sub-bands are divided in the frequency domain, the bandwidth of each sub-band is 20M, and the current uplink carrier bandwidth corresponds to 5 sub-bands, which are Sub-band 1 (whose corresponding bandwidth range is 0~20M), Sub-band 2 (whose corresponding bandwidth range is 20~40M), Sub-band 3 (whose corresponding bandwidth range is 40~60M), Sub-band 4 (whose corresponding bandwidth range is 60~80M), and Sub-band 5 (whose corresponding bandwidth range is 80~100M). Those skilled in the art can understand that in specific implementations, the carrier bandwidth may be aligned with the sub-bands, or there may be a certain offset.

In some embodiments, before performing LBT on the at least one sub-band used for transmitting uplink data, the at least one sub-band used for performing LBT may be determined first. It can be understood that how to determine the at least one sub-band used for performing LBT should not be a limitation of the present disclosure and fall within the scope of the present disclosure.

In some embodiments, a base station may directly use a Radio Resource Control (RRC) or a Downlink Control Information (DCI) to indicate to the UE which sub-bands are used as the at least one sub-band for transmitting uplink data, that is, the at least one sub-band used to perform LBT.

In some embodiments, the UE may determine the at least one sub-band used to perform LBT by itself.

In some embodiments, determining the at least one sub-band used for performing LBT may include: matching the resource used for transmitting uplink data with a preset sub-band bandwidth; determining all the at least one sub-band corresponding to the resource used for transmitting uplink data as the at least one sub-band used for performing LBT.

In some embodiments, before the UE transmits uplink data, the base station configures the resource for transmitting uplink data for the UE, and the UE performs uplink data transmission based on the resources for transmitting uplink data configured by the base station. When determining the at least one sub-band used for performing LBT, the UE may match the resource configured by the base station for transmitting uplink data with the preset sub-band bandwidth, where the matching principle includes that the preset sub-band bandwidth can cover the resource used for transmitting uplink data; and then all the at least one sub-band corresponding to the resource used for transmitting uplink data is determined as the at least one sub-band used for performing LBT.

For example, referring to FIG. 2, FIG. 2 schematically illustrates resources configured for a UE to transmit uplink data on uplink Bandwidth-Part (BWP) of a base station. The resources for transmitting uplink data may be non-contiguous in the frequency domain. For example, resources r1, r2, r3, and r4 may be configured on the BWP. The resource for transmitting uplink data may also be continuous in the frequency domain. For example, resource r5 may be configured on the BWP.

By matching the resources for transmitting uplink data with bandwidth ranges of a sub-band of Sub-band 1 to Sub-band 5, respectively, and it can be determined that sub-bands corresponding to the resource for transmitting uplink data are Sub-band 1 to Sub-band 4. And the UE can use Sub-band 1 to Sub-band 4 as the sub-bands for transmitting uplink data, that is, LBT may be performed on Sub-band 1 to Sub-band 4, respectively.

In some embodiments, as a data receiving end, the base station may assume or default that the UE transmits uplink data on a sub-band where the UE transmits a De-Modulation Reference Signal (DMRS) when the base station does not know which sub-band the UE transmits uplink data on. Therefore, the base station may blindly detect whether the DMRS is transmitted on each sub-band corresponding to the resource used for transmitting uplink data, and then determine whether the UE transmits uplink data on the sub-band for transmitting the DMRS. If the DMRS is detected on a certain sub-band, the base station may determine that the UE has transmitted uplink data on the certain sub-band, and then decode the data on the certain sub-band.

In some embodiments, if the base station may only determine whether the UE has performed uplink data transmission on these sub-bands by detecting the DMRS transmitted on all the sub-bands, the base station may perform blind detection on each sub-band and each combination of some sub-bands, respectively. For example, when the number of the at least one sub-band corresponding to the resource used by the UE for transmitting uplink data is 4, the number of times the base station needs to perform blind detection is:

$$C_4^1 + C_4^2 + C_4^3 + C_4^4.$$

If the base station can blindly detect the DMRS transmitted on a single sub-band to determine whether the UE has performed uplink data transmission on the sub-band, then the number of times the base station needs to perform blind detection is 4.

In other embodiments, determining the at least one sub-band used for performing LBT may include: matching the resource used for transmitting uplink data with a preset sub-band bandwidth, and determining a number of the at least one sub-band corresponding to the resource used for transmitting uplink data; determining each sub-band in a preset sub-band set as the at least one sub-band for performing LBT, where a number of sub-bands in the preset sub-band set matches with the number of the at least one sub-band corresponding to the resource used for transmitting uplink data.

In the embodiments of the present disclosure, the number of the at least one sub-band corresponding to the resource used for transmitting uplink data may be identified as M, where M≥1, and M is a positive integer.

In some embodiments, a value of M and one or more sub-band sets corresponding to the value of M may be preset, and after the value of M is determined based on the resource for transmitting uplink data configured by the base station, one of the one or more sub-band sets corresponding to the value of M may be determined as the preset sub-band set, and each sub-band in the preset sub-band set is determined to be the sub-band for performing LBT.

Specifically, a variety of methods may be used to preset the value of M and the one or more sub-band sets corresponding to the value of M, which will not be limited here.

In an embodiment, in order to reduce complexity of the blind detection, the base station may indicate multiple sub-band sets corresponding to different values of M through a high-layer signaling.

For example, the base station may indicate to the UE multiple sub-band sets corresponding to different M values through the high-layer signaling (such as a RRC signaling). In this situation, the base station may only perform blind detection on the multiple sub-band sets corresponding to the value of M determined by the resource for transmitting uplink data, instead of performing blind detection on all sub-band combinations, thereby reducing the blind detection complexity of the base station.

In another embodiment, a sub-band mapping table may be preset, which includes a mapping relation between different M values and sub-band sets. The sub-band mapping table may be stored in the UE or in other external storage media. After the value of M is determined according to the resource used for transmitting uplink data configured by the base station, multiple sub-band sets corresponding to the value of M may be obtained by searching the sub-band mapping table, and then a sub-band set selected from the sub-band sets corresponding to the value of M may be determined as the preset sub-band set.

For example, referring to Table 1, the value of M may be 4, 8, and 16. When the value of M is different, the corresponding multiple sub-band sets may be different accordingly. Take the value of M as 4 as an example, the number of the at least one sub-band corresponding to the resource used for transmitting uplink data is 4, for example, Sub-band 1 to Sub-band 4. In this case, the sub-band sets corresponding to the value of M may include: {1}, {2}, {3}, {4}, {1, 2}, {3, 4}, {1, 2, 3, 4}, wherein 1, 2, 3, and 4 in each sub-band set represent an identification of a corresponding sub-band, respectively.

In some embodiments, a sub-band set may be selected from the sub-band sets corresponding to the value of M as the preset sub-band set, according to a preset set selection rule or according to an instruction from the base station.

Specifically, the preset set selection rule may be set in the following way: after the UE performs LBT on M sub-bands and a result of the LBT is that only k sub-bands succeed, the UE may determine that a sub-band set having K sub-bands, wherein sequence numbers of sub-bands in the selected sub-band set are consistent with sequence numbers of the k sub-bands on which LBT is performed successfully, may be selected from the sub-band sets corresponding to the value of M, and perform uplink data transmission on the sub-bands included in the selected sub-band set; where M and k are both positive Integers, and k<=M.

Optionally, if the UE cannot find the sub-band set which has K sub-bands and the sequence numbers of sub-bands in the selected sub-band set are consistent with the sequence numbers of the k sub-bands on which LBT is performed successfully, the UE may select a sub-band set including (k−1) sub-bands, if (k−1)>=1, wherein sequence numbers of sub-bands in the selected sub-band set are consistent with the sequence numbers of the k sub-bands on which LBT is performed successfully, and so on, until the UE finds a sub-band set that meets the requirements, and then the UE performs uplink data transmission on sub-bands included in the selected sub-band set. If a number of the selected sub-band set is more than one, the UE may to perform uplink data transmission on any one of the selected sub-band set that meet the requirements.

Optionally, if the UE cannot find a sub-band set which has K sub-bands and the sequence numbers of sub-bands in the selected sub-band set are consistent with the sequence numbers of the k sub-bands on which LBT is performed successfully, the UE does not perform uplink data transmission.

TABLE 1

| Numbers | M | Sub-band sets |
| --- | --- | --- |
| 1 | 4 | {1}, {2}, {3}, {4}, {1, 2}, {3, 4}, {1, 2, 3, 4} |
| 2 | 8 | . . . |
| 3 | 16 | . . . |

In some embodiments, the base station may indicate to the UE the preset sub-band set through a DCI. In this case, the base station may only perform blind detection on multiple sub-bands in the preset sub-band set indicated by the DCI, instead of detecting all sub-band combinations blindly, thereby reducing the complexity of blind detection.

In some embodiments, after determining the at least one sub-band corresponding to the resources used for transmitting uplink data, LBT is performed on the at least one sub-band used for transmitting uplink data, respectively, that is, each sub-band used for transmitting uplink data is monitored independently. If the LBT on a certain sub-band succeeds, the certain sub-band is idle and can be used to transmit uplink data. If the LBT on a certain sub-band fails, the certain sub-band is busy and cannot be used to transmit uplink data.

In some embodiments, the uplink data may be a Physical Uplink Shared Channel (PUSCH), a Physical Uplink Control Channel (PUCCH), a Physical Random Access Channel (PRACH), an uplink Sounding Reference Signal (SRS), other reference signals or channels.

In step 12: uplink data is transmitted on at least one sub-band on which LBT succeeds.

Referring to FIG. 2, the sub-bands used for transmitting uplink data are Sub-band 1 to Sub-band 4, and LBT is performed on Sub-band 1 to Sub-band 4, respectively. Sub-bands on which LBT succeeds are Sub-band 1, Sub-band 2, and Sub-band 4. LBT on Sub-band 3 fails.

In this case, the UE can transmit uplink data on sub-bands on which LBT succeeds, that is, uplink data can be transmitted on Sub-band 1, Sub-band 2, and Sub-band 4.

In order to improve resource utilization, in an embodiment of the present disclosure, before transmitting uplink data on the at least one sub-band on which LBT succeeds, whether a number of the at least one sub-band on which LBT succeeds exceeds a corresponding sub-band threshold is determined, and if the number of the at least one sub-band on which LBT succeeds, exceeds the corresponding sub-band threshold, uplink data is transmitted on the at least one sub-band on which LBT succeeds.

For example, the number of the at least one sub-band used for transmitting uplink data is 4, but LBT performed on 3 of the four sub-bands fails. In this case, if the UE uses the one sub-band with successful LBT to transmit uplink data, the possibility of the base station successfully receiving uplink data will be very low. In this case, instead of transmitting uplink data on the one sub-band with successful LBT, it is better for the UE to give the transmission opportunity to WIFI and other wireless systems working in an unlicensed frequency band, so as to improve resource utilization.

Specifically, the number of the at least one sub-band used for transmitting uplink data and the corresponding sub-band threshold may be set in various ways, which is not limited here.

Specifically, the number of the at least one sub-band used for transmitting uplink data may be identified as M, and the corresponding sub-band threshold may be identified as N, where N is a positive integer and N≥1.

In some embodiments, each value of M may be set to have only one corresponding sub-band threshold, and the only one sub-band threshold corresponding the value of M is N. The base station may indicate to the UE different values of M and different values of N corresponding to each value of M through a high-layer signaling (such as RRC signaling) in advance.

For example, referring to Table 2, when the number of the at least one sub-band used for transmitting is 4, N may be set to be 2. In other words, when the number of the at least one sub-band on which LBT succeeds, exceeds 2, uplink data transmission will be performed on the at least one sub-band on which LBT succeeds; otherwise, uplink data transmission will not be performed. When the number of the at least one sub-band used for transmitting is 84, N may be set to be 4. In other words, when the number of the at least one sub-band on which LBT succeeds, exceeds 4, uplink data transmission will be performed on the at least one sub-band on which LBT succeeds; otherwise, uplink data transmission will not be performed.

TABLE 2

| Numbers | (M, N) |
|---|---|
| 1 | (4, 2) |
| 2 | (8, 4) |

TABLE 2-continued

| Numbers | (M, N) |
|---|---|
| 3 | (16, 8) |
| 4 | (32, 20) |

In other embodiments, the sub-band threshold corresponding to each value of M may be set to be a candidate sub-band threshold set. The base station indicate different values of M and candidate sub-band threshold sets corresponding to each value of M to the UE in advance through a high-level signaling (such as a RRC signaling); and after the value of M is determined, the base station indicates a sub-band threshold corresponding to the determined value of M to the UE through the DCI, that is, the value of N.

Of course, after the value of M is determined, the UE may also select one from the candidate sub-band threshold set corresponding to the value of M as the value of N, according to a preset threshold selection rule. It should be understood that how to determine the value of N should not be a limitation to the present disclosure, and should be within the scope of the present disclosure.

For example, referring to Table 3, when the value of M is 4, the corresponding candidate sub-band threshold set may be {1, 2, 3}, and the UE may according to an instruction of the base station or the preset threshold selection rule, select one from the candidate sub-band threshold set {1, 2, 3} as the value of N. For example, 3 may be selected as the value of N corresponding to the value of M 4. In this case, when the number of the at least one sub-band on which LBT succeeds exceeds 3, uplink data transmission will be performed on the at least one sub-band on which LBT succeeds; otherwise, uplink data transmission will not be performed.

TABLE 3

| Numbers | M | N |
|---|---|---|
| 1 | 4 | {1, 2, 3} |
| 2 | 8 | {1, 2, 4, 6} |
| 3 | 16 | {1, 2, 4, 8, 10, 12} |

Specifically, uplink data may be transmitted on the at least one sub-band on which LBT succeeds in various ways, which should not be a limitation to the present disclosure.

In some embodiments, before performing LBT on the at least one sub-band used for transmitting uplink data, the uplink data may be mapped to the resource used for transmitting uplink data, and a punching operation may be performed on uplink data on which LBT has failed.

Specifically, referring to FIG. 2, after Sub-band 1 to Sub-band 4 are determined as the at least one sub-band used for transmitting uplink data, uplink data to be transmitted are mapped on Sub-band 1 to Sub-band 4, so that each sub-band is mapped with all the uplink data to be transmitted. After LBT is performed on Sub-band 1 to Sub-band 4, the uplink data may be transmitted on sub-bands on which LBT succeeds. In this case, the base station may perform blind detection on each sub-band to receive the uplink data. After that, the UE may perform the puncturing operation on the uplink data on sub-bands on which LBT fails (that is, r3 and r6), in other words, the UE may delete the uplink data mapped on the sub-bands on which LBT fails according to a certain rule.

In some embodiments, before transmitting uplink data on sub-bands on which LBT succeeds, rate matching may be performed on the sub-bands on which LBT succeeds, that is, the uplink data to be transmitted are matched with load capacity of physical channels.

Specifically, referring to FIG. 2, after Sub-band 1, Sub-band 2 and Sub-band 4 are determined as sub-bands with successful LBT, rate matching is performed on Sub-band 1, Sub-band 2 and Sub-band 4. The base station may perform blind detection on each sub-band, receive uplink data transmitted on each sub-band, and finally obtain all the uplink data. In addition, the base station may also perform joint blind detection on multiple sub-bands to obtain all the uplink data.

As described above, the base station does not know on which sub-bands the UE is transmitting uplink data, the base station may blindly detect whether a DMRS is transmitted on each sub-band corresponding to the resource used for transmitting uplink data, and then determine whether the UE transmits uplink data on the sub-bands on which the DMRS is transmitted.

In some embodiments, in order to reduce complexity of the blind detection of the base station, while transmitting the uplink data on the sub-bands with successful LBT, the UE may also send an indication information about the preset sub-band set to the base station, so that the base station only performs blind detection on each sub-band in the preset sub-band set indicated by the UE, instead of blindly detecting other sub-band sets.

In some embodiments, the indication information about the preset sub-band set may be carried by a PUCCH.

In addition, the indication information about the preset sub-band set may be indicated in a variety of ways, which is not specifically limited here. In one embodiment, the indication information about the preset sub-band set may be a bitmap, for example, 1010 indicates that the UE has performed uplink data transmission on Sub-band 1 and Sub-band 3; 1110 indicates that the UE has performed uplink data transmission on Sub-band 1, Sub-band 2 and Sub-band 3.

Optionally, the base station may use a PDCCH to indicate to the UE which PUCCH resource is used to display which sub-bands have been used for uplink data transmission. For example, the base station may configure a set of PUCCH resources through a high-level signaling (such as, a RRC), and then use a PDCCH to indicate which PUCCH resource is used to display which sub-bands have been used for uplink data transmission. Optionally, the base station may use a PDCCH to indicate both a set of PUCCH resources and which PUCCH resource is used to display which sub-bands have been used for uplink data transmission.

Optionally, the base station may use the PDCCH to indicate to the UE which sub-band to display which sub-bands have been used for uplink data transmission, where the PUCCH resource of each sub-band may be pre-configured by a higher layer signaling (such as a RRC).

Optionally, the base station may use the PDCCH to indicate which PUCCH resources of which sub-bands may carry an indication information indicating which sub-bands have been used for uplink data transmission.

Optionally, a high-level signaling may be used to configure a PUCCH resource on each sub-band, and then the PDCCH or a MAC-CE may be used to indicate which PUCCH resources on which sub-bands will be used, which may be a bitmap and each bit in the bitmap corresponds to one sub-band.

Optionally, the PUCCH used to indicate which sub-bands have been used for uplink data transmission may be piggybacked in the UE's uplink data transmission (for example, PUSCH). Optionally, the PUCCH may be piggybacked in all the sub-bands used for uplink data transmission repeatedly or only piggybacked in a sub-band with a largest or smallest sequence number among the sub-bands used for uplink data transmission. Optionally, the PUCCH may be piggybacked on any sub-band or sub-band set used for uplink data transmission by the UE.

It should be understood that the uplink data transmission method provided in the embodiments of the present disclosure may be used not only in the LTE system, but also in an uplink transmission process of the fifth-generation mobile communication (5G) New Radio (NR) system, or in other wireless systems.

In summary, the uplink data transmission method provided in the embodiments of the present disclosure performs LBT on the at least one sub-band used for transmitting uplink data, and the uplink data are transmitted on the at least one sub-band on which LBT succeeds, without waiting for the entire carrier bandwidth, which facilitates to improve data transmission efficiency and resource utilization effectively.

In order to clarify the object, characteristic and advantages of embodiments of the present disclosure, a user equipment and a computer-readable storage medium corresponding to the above uplink data transmission method are described in detail below.

In an embodiment of the present disclosure, a user equipment 30 is provided, and the user equipment 30 may include an LBT execution unit 31 and a data transmission unit 32.

The LBT execution unit 31 is adapted to perform LBT on at least one sub-band corresponding to a resource used for transmitting uplink data, respectively; wherein a frequency domain is divided into two or more sub-bands, and the resource used for transmitting uplink data corresponds to at least one of the two or more sub-bands.

The data transmission unit 32 is adapted to transmit the uplink data on at least one sub-band on which LBT succeeds.

In some embodiments, the user equipment 30 may further include: a data mapping unit 33 and a puncturing unit 34.

The data mapping unit 33 is adapted to map the uplink data to the resource used for transmitting the uplink data before transmitting the uplink data on the at least one sub-band on which LBT succeeds.

The puncturing unit 34 is adapted to, before transmitting the uplink data on the at least one sub-band on which LBT succeeds, perform a puncturing operation on uplink data mapped on some sub-bands on which LBT fails.

Figure 4:
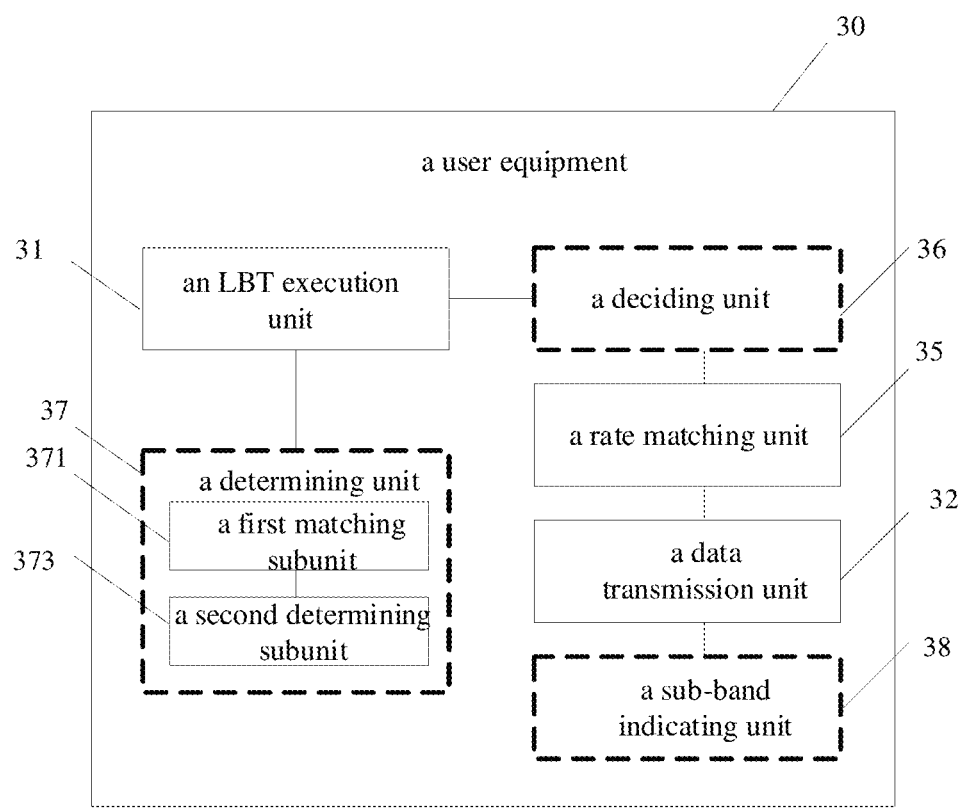
FIG. 4 is a structural diagram of a user equipment according to another embodiment.

In some embodiments, referring to FIG. 4, the user equipment 30 may further include a rate matching unit 35.

The rate matching unit 35 is adapted to, before transmitting the uplink data on the at least one sub-band on which LBT succeeds, perform rate matching on the at least one sub-band on which LBT succeeds.

Figure 3:
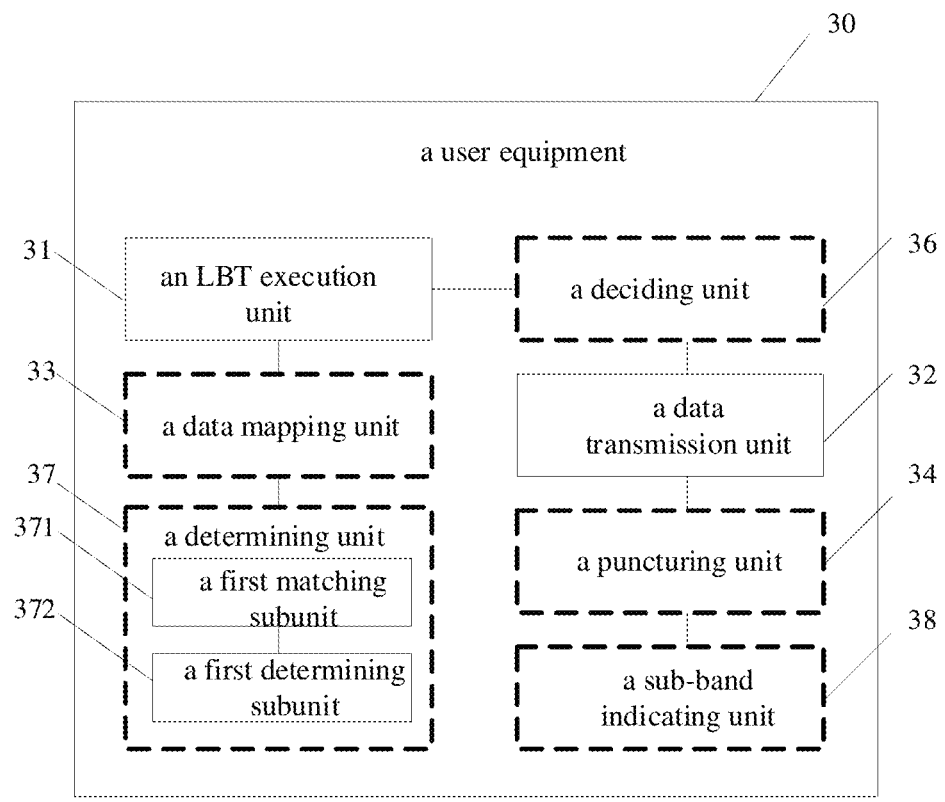
FIG. 3 is a structural diagram of a user equipment according to an embodiment.

In some embodiments, referring to FIG. 3 and FIG. 4, the user equipment 30 may further include a deciding unit 36.

The deciding unit 36 is adapted to decide whether a number of the at least one sub-band on which LBT succeeds exceeds a corresponding sub-band threshold.

Correspondingly, the data transmission unit 32 is adapted to, when the number of the at least one sub-band on which LBT succeeds exceeds the corresponding sub-band threshold, transmit the uplink data on the at least one sub-band on which LBT succeeds.

In some embodiments, the sub-band threshold corresponding to the number of the at least one sub-band used for performing LBT is one of the candidate sub-band threshold sets.

In some embodiments, the number of the at least one sub-band used for performing LBT and the sub-band threshold corresponding to the number of the at least one sub-band used for performing LBT are indicated by the base station through a higher layer signaling (such as a RRC signaling).

In some embodiments, the number of the at least one sub-band used for performing LBT and the candidate sub-band threshold set corresponding to the number of the at least one sub-band used for performing LBT are indicated by the base station through a high-layer signaling (such as a RRC signaling), and the sub-band threshold corresponding to the number of the at least one sub-band used for performing LBT is indicated by the base station through a DCI.

In some embodiments, referring to FIG. 3 and FIG. 4, the user equipment 30 may further include a determining unit 37, wherein the determining unit 37 is adapted to, before performing LBT on the at least one sub-band corresponding to the resource used for transmitting uplink data, determine the at least one sub-band used for performing LBT.

In some embodiments, referring to FIG. 3, the determining unit 37 may include: a first matching subunit 371 and a first determining subunit 372.

In some embodiments, the first matching subunit 371 is adapted to match the resource used for transmitting uplink data with a preset sub-band bandwidth.

In some embodiments, the first determining subunit 372 is adapted to use all the at least one sub-band corresponding to the resource used for transmitting uplink data as the at least one sub-band used for performing LBT.

In some embodiments, referring to FIG. 4, the determining unit 37 may include: the first matching subunit 371 and a second determining subunit 373.

In some embodiments, the first matching subunit 371 is adapted to match the resource used for transmitting uplink data with a preset sub-band bandwidth, and determine a number of sub-bands included in the resource used for transmitting uplink data.

In some embodiments, the second determining subunit 373 is adapted to use each sub-band in the preset sub-band set as the at least one sub-band for performing LBT, wherein a number of the preset sub-band set matches the number of the at least one sub-band corresponding to the resource used for transmitting uplink data.

It should be understood that, in some embodiments, the user equipment 30 may or may not include the determining unit 37. When the user equipment includes the determining unit 37, the determining unit 37 may include the first matching subunit 371 and the first determining subunit 372, or include the first matching subunit 371 and the second determining subunit 373.

In some embodiments, the second determining subunit 373 is adapted to use one of multiple sub-band sets indicated by the base station through a high-layer signaling as the preset sub-band set, wherein numbers of all the multiple sub-band sets match with the number of the at least one sub-band corresponding to the resource used for transmitting uplink data.

In some embodiments, the preset sub-band set is indicated by the base station through a DCI.

In some embodiments, the second determining subunit 373 is adapted to select one from a plurality of sub-band sets corresponding to a preset sub-band mapping table as the preset sub-band set, wherein a number of each of the plurality of sub-band sets matches with the number of the at least one sub-band corresponding to the resource used for transmitting uplink data.

In some embodiments, referring to FIG. 3 and FIG. 4, the user equipment 30 may further include: a sub-band indicating unit 38, wherein the sub-band indicating unit 38 is adapted to send an indication information about the preset sub-band set to the base station when the uplink data is transmitted on the at least one sub-band with successful LBT.

In an embodiment of the present disclosure, a computer readable storage medium having computer instructions stored therein is provided, wherein once the computer instructions are executed, the above uplink data transmission method is performed.

The computer readable storage medium may include a Read Only Memory (ROM), a Random Access Memory (RAM), a magnetic disk, an optical disk or the like.

In an embodiment of the present disclosure, a user equipment including a memory and a processor is provided, wherein the memory has computer instructions stored therein, and when the processor executes the computer instructions, the above uplink data transmission method is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An uplink data transmission method, comprising:
performing Listen Before Talk (LBT) respectively on at least one sub-band corresponding to a resource used for transmitting uplink data, wherein a frequency domain is divided into two or more sub-bands, and the resource used for transmitting uplink data corresponds to at least one of the two or more sub-bands; and
transmitting the uplink data on at least one sub-band on which LBT succeeds;
wherein said transmitting the uplink data on the at least one sub-band on which LBT succeeds comprises:
determining whether a number of the at least one sub-band on which LBT succeeds exceeds a corresponding sub-band threshold; and
based on that the number of the at least one sub-band on which LBT exceeds the corresponding sub-band threshold, transmitting the uplink data on the at least one sub-band on which LBT succeeds.

2. The uplink data transmission method according to claim 1, wherein before transmitting the uplink data on the at least one sub-band on which LBT succeeds, the uplink data transmission method further comprises:
mapping the uplink data to the resource used for transmitting the uplink data; and
performing a puncturing operation on the uplink data on sub-bands on which LBT fails.

3. The uplink data transmission method according to claim 1, wherein before transmitting the uplink data on the at least one sub-band on which LBT succeeds, the uplink data transmission method further comprises:
performing rate matching on the at least one sub-band on which LBT succeeds.

4. The uplink data transmission method according to claim 1, wherein a base station indicates the number of the at least one sub-band used for performing LBT and the candidate sub-band threshold set corresponding to the number of the at least one sub-band used for performing LBT through a high-layer signaling, and indicates the sub-band threshold corresponding to the number of the at least one sub-band used for performing LBT through a DCI.

5. The uplink data transmission method according to claim 1, wherein a sub-band threshold corresponding to a number of the at least one sub-band used for performing LBT is one selected from a candidate sub-band threshold set.

6. The uplink data transmission method according to claim 5, wherein a base station indicates the number of the at least one sub-band used for performing LBT and the sub-band threshold corresponding to the number of the at least one sub-band used for performing LBT through a high-layer signaling.

7. The uplink data transmission method according to claim 5, wherein the base station indicates the number of the at least one sub-band used for performing LBT and the candidate sub-band threshold set corresponding to the number of the at least one sub-band used for performing LBT through a high-layer signaling, and indicates the sub-band threshold corresponding to the number of the at least one sub-band used for performing LBT through a Downlink Control Information (DCI).

8. The uplink data transmission method according to claim 1, wherein before performing LBT respectively on the at least one sub-band corresponding to the resource used for transmitting uplink data, the uplink data transmission method further comprises:
   determining the at least one sub-band used for performing LBT.

9. The uplink data transmission method according to claim 8, wherein determining the at least one sub-band used for performing LBT comprises:
   matching the resource used for transmitting uplink data with a preset sub-band bandwidth; and
   using all the at least one sub-band corresponding to the resource used for transmitting uplink data as the at least one sub-band used for performing LBT.

10. The uplink data transmission method according to claim 8, wherein determining the at least one sub-band used for performing LBT comprises:
    matching the resource used for transmitting uplink data with a preset sub-band bandwidth, and determining the number of the at least one sub-band corresponding to the resource used for transmitting uplink data; and
    using each sub-band in a preset sub-band set as the at least one sub-band used for performing LBT, wherein a number of the preset sub-band set matches the number of the at least one sub-band corresponding to the resource used for transmitting uplink data.

11. The uplink data transmission method according to claim 10, wherein one of multiple sub-band sets indicated by the base station through a high-layer signaling is selected as the preset sub-band set, wherein a number of each of the multiple sub-band sets matches with the number of the at least one sub-band corresponding to the resource used for transmitting uplink data.

12. The uplink data transmission method according to claim 11, wherein the base station indicates that one of the multiple sub-band sets is selected as the preset sub-band set through a DCI.

13. The uplink data transmission method according to claim 10, wherein one of a plurality of sub-band sets corresponding to a preset sub-band mapping table is selected as the preset sub-band set, wherein a number of each of the plurality of sub-band sets matches with the number of the at least one sub-band corresponding to the resource used for transmitting uplink data.

14. The uplink data transmission method according to claim 13, wherein transmitting the uplink data on the at least one sub-band on which LBT succeeds further comprises:
    sending an indication information about the preset sub-band set to the base station.

15. The uplink data transmission method according to claim 11, wherein transmitting the uplink data on the at least one sub-band on which LBT succeeds further comprises:
    sending an indication information about the preset sub-band set to the base station.

16. The uplink data transmission method according to claim 1, wherein a base station indicates the number of the at least one sub-band used for performing LBT and the sub-band threshold corresponding to the number of the at least one sub-band used for performing LBT through a high-layer signaling.

17. A non-transitory computer readable storage medium having computer instructions stored therein, wherein once the computer instructions are executed, the method according to claim 1 is performed.

18. A user equipment comprising a non-transitory memory and a processor, wherein the memory has computer instructions stored therein, and when the processor executes the computer instructions, the method according to claim 1 is performed.

* * * * *